(12) United States Patent
Alexander

(10) Patent No.: US 8,720,953 B2
(45) Date of Patent: May 13, 2014

(54) RISER BENDING RELIEF JOINT

(75) Inventor: David James Alexander, Banchory (GB)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 13/364,664

(22) Filed: Feb. 2, 2012

(65) Prior Publication Data

US 2012/0193906 A1  Aug. 2, 2012

(51) Int. Cl.
*F16L 27/04* (2006.01)
(52) U.S. Cl.
USPC ............................ 285/268; 285/261; 29/428
(58) Field of Classification Search
USPC ......... 285/271, 269, 268, 267, 261, 262, 264, 285/265; 29/428
See application file for complete search history.

(56) References Cited

U.S. PATENT DOCUMENTS

| | | | | |
|---|---|---|---|---|
| 210,910 A | * | 12/1878 | Brady | 285/261 |
| 269,836 A | * | 1/1883 | Deschamps | 285/269 |
| 716,104 A | * | 12/1902 | Reilly | 285/269 |
| 973,558 A | * | 10/1910 | Pierce | 285/269 |
| 1,179,594 A | * | 4/1916 | Wood | 285/261 |
| 1,300,945 A | * | 4/1919 | Field | 285/261 |
| 1,620,094 A | * | 3/1927 | Gillick | 285/267 |
| 3,433,504 A | | 3/1969 | Hanes | |
| 3,523,578 A | | 8/1970 | Nolan, Jr. et al. | |
| 3,663,043 A | * | 5/1972 | Walton | 285/264 |
| 3,695,633 A | | 10/1972 | Hanes | |
| 3,701,551 A | * | 10/1972 | Morgan | 285/261 |
| 3,977,707 A | | 8/1976 | Oliver | |
| 4,005,881 A | * | 2/1977 | Burton et al. | 285/261 |
| 4,045,054 A | * | 8/1977 | Arnold | 285/261 |
| 4,139,221 A | * | 2/1979 | Shotbolt | 285/261 |
| 4,153,112 A | | 5/1979 | Luke | |
| 4,489,962 A | * | 12/1984 | Caumont et al. | 285/268 |
| 4,946,202 A | * | 8/1990 | Perricone | 29/428 |

FOREIGN PATENT DOCUMENTS

GB  2107815 A  5/1983
WO  2009/019515 A2  2/2009

OTHER PUBLICATIONS

Search Report and Written Opinion from corresponding EP Application No. 11153025.9 dated Jul. 28, 2011; and Search Report and Written Opinion from corresponding EP Application No. 11187703.1 dated Feb. 1, 2012.

* cited by examiner

*Primary Examiner* — David E Bochna
(74) *Attorney, Agent, or Firm* — Global Patent Operation

(57) ABSTRACT

A connector for use with a subsea riser installation is provided. The connector comprises a body, wherein the body comprises a first connecting face comprising a through-passageway and adapted for connection to a first external conduit element and a ball joint within the body, wherein the ball joint comprises a through-passageway which is substantially aligned with the through-passageway in the first face, and a second connecting face on an opposite side of the connector to the first connecting face and adapted for connection to a second external conduit element. The connector further comprises at least one detent mechanism adapted to engage a corresponding locating feature on the ball joint, wherein the through-passageway are maintained in alignment and wherein the ball joint is prevented from moving relative to the body until a predetermined bending moment is applied to the ball joint across the axis of the through-passageway in the ball joint.

20 Claims, 12 Drawing Sheets

RISER BENDING RELIEF JOINT

BACKGROUND OF THE INVENTION

1. Field of the Invention

Embodiments of the present invention relate to a connector with a ball joint operable as a bending relief joint, to relieve the bending stress applied at high bending locations in a subsea riser, in the event that the applied bending moments exceed a predetermined bending limit.

2. Description of the Prior Art

Offshore oil and gas production installations typically have a wellhead on the seabed and production connections on a subsea tree. For production completion or workover purposes, a riser pipe string may be connected between the subsea tree and a surface vessel, such as a semi-submersible or drill-ship responsible for carrying out the desired well intervention.

The surface vessel may be maintained in position above the well by means of anchors or by dynamic location using the global positioning system (GPS) and thrusters in the vessel to counteract drift. In operating conditions, some angular displacement of the surface vessel away from the vertical above the well will be acceptable to cope with drift caused by changes in local conditions, including tides and weather. In a given situation the operating range within which a surface vessel may safely drift will depend on various factors, including the tensile and bending limits of the riser. In unexpected or extreme circumstances, for example if an anchor slips or GPS fails or in a sudden storm, the surface vessel may drift to the extent that emergency action may be required to avoid damage to the riser or the wellhead.

For such purposes, the riser string may include a safety joint—a 'weak link' designed to fail in tension below the limits of an ordinary riser pipe. To protect the wellhead, an emergency disconnect package (EDP) utilizing a quick disconnect connector may be provided at the base of the riser string.

In the past, various types of ball joint or flexible connectors have been proposed to allow some degree of continuing flexure in a tubular riser string.

However, these systems are not themselves designed to be triggered by, or to provide protection against, excessive bending moments which may be applied to or by the riser, in cases of extreme angular displacement from the vertical. Further difficulties may also arise owing to local environmental differences such as strength of tides and depth of the water at the well site. In shallower water, a surface vessel is necessarily more limited in absolute terms in the extent of allowable drift, and the shorter length of riser behaves more rigidly than longer lengths in deep water. Different stresses arise and safety systems need to be adapted correspondingly.

BRIEF SUMMARY OF THE INVENTION

Embodiments of the present invention are directed to providing a relief joint for relieving bending stress in a subsea riser, the relief joint may be adjustable to selected limits and to address variations in relevant operating parameters in different locations.

According to an embodiment of the present invention, there is provided a connector for use with a subsea riser installation. The connector comprises a body, wherein the body comprises a first connecting face comprising a through-passageway and adapted for connection to a first external conduit element and a ball joint within the body, wherein the ball joint comprises a through-passageway which is substantially aligned with the through-passageway in the first face, and a second connecting face on an opposite side of the connector to the first connecting face and adapted for connection to a second external conduit element. The connector further comprises at least one detent mechanism adapted to engage a corresponding locating feature on the ball joint, wherein the through-passageway in the first face and the through-passageway in the ball joint are maintained in alignment and wherein the ball joint is prevented from moving relative to the body until a predetermined bending moment is applied to the ball joint across the axis of the through-passageway in the ball joint.

According to another embodiment of the present invention, there is provided a connector for use with a subsea riser installation. The connector comprises a body, wherein the body comprises: a first connecting face having a through-passageway and adapted for connection to a first external conduit element and a ball joint within the body, wherein the ball joint comprises a through-passageway which is substantially aligned with the through-passageway in the first face; and a second connecting face on an opposite side of the connector to the first connecting face and adapted for connection to a second external conduit element. The connector also comprises a plurality of detent mechanisms adapted to engage corresponding locating features on the ball joint, wherein the through-passageway in the first face and the through-passageway in the ball joint are maintained in alignment and the ball joint is prevented from moving relative to the body until a predetermined bending moment is applied to the ball joint across the axis of the through-passageway in the ball joint, wherein the detent mechanisms are evenly spaced around the axis of the through-passageway in the first face of the body and each of the detent mechanisms comprises at least one adjustment mechanism configured to adjust the force to be applied to the corresponding locating feature for determining the predetermined bending moment required to trigger movement of the ball joint.

According to another embodiment of the present invention, there is provided a method of providing a relief joint for a riser installation. The method comprises providing a connector comprising: a body, wherein the body comprises a first connecting face comprising a through-passageway, a ball joint within the body, wherein the ball joint comprises a through-passageway which is substantially aligned with the through-passageway in the first face, a second connecting face on an opposite side of the connector to the first connecting face, and at least one detent mechanism which engages a corresponding locating feature on the ball joint, wherein the through-passageway in the first face and the through-passageway in the ball joint are maintained in alignment and the ball joint is prevented from moving relative to the body until a predetermined bending moment is applied to the ball joint across the axis of the through-passageway in the ball joint. The method also comprises connecting the first connecting face to a first external conduit element; and connecting the second connecting face to a second external conduit element.

According to another embodiment of the present invention, there is provided a riser installation comprising a connector according to other embodiments of the present invention.

BRIEF DESCRIPTION OF THE DRAWINGS

Various aspects and embodiments of the present invention will now be described in connection with the accompanying drawings, in which.

DETAILED DESCRIPTION OF THE INVENTION

Figure 1:
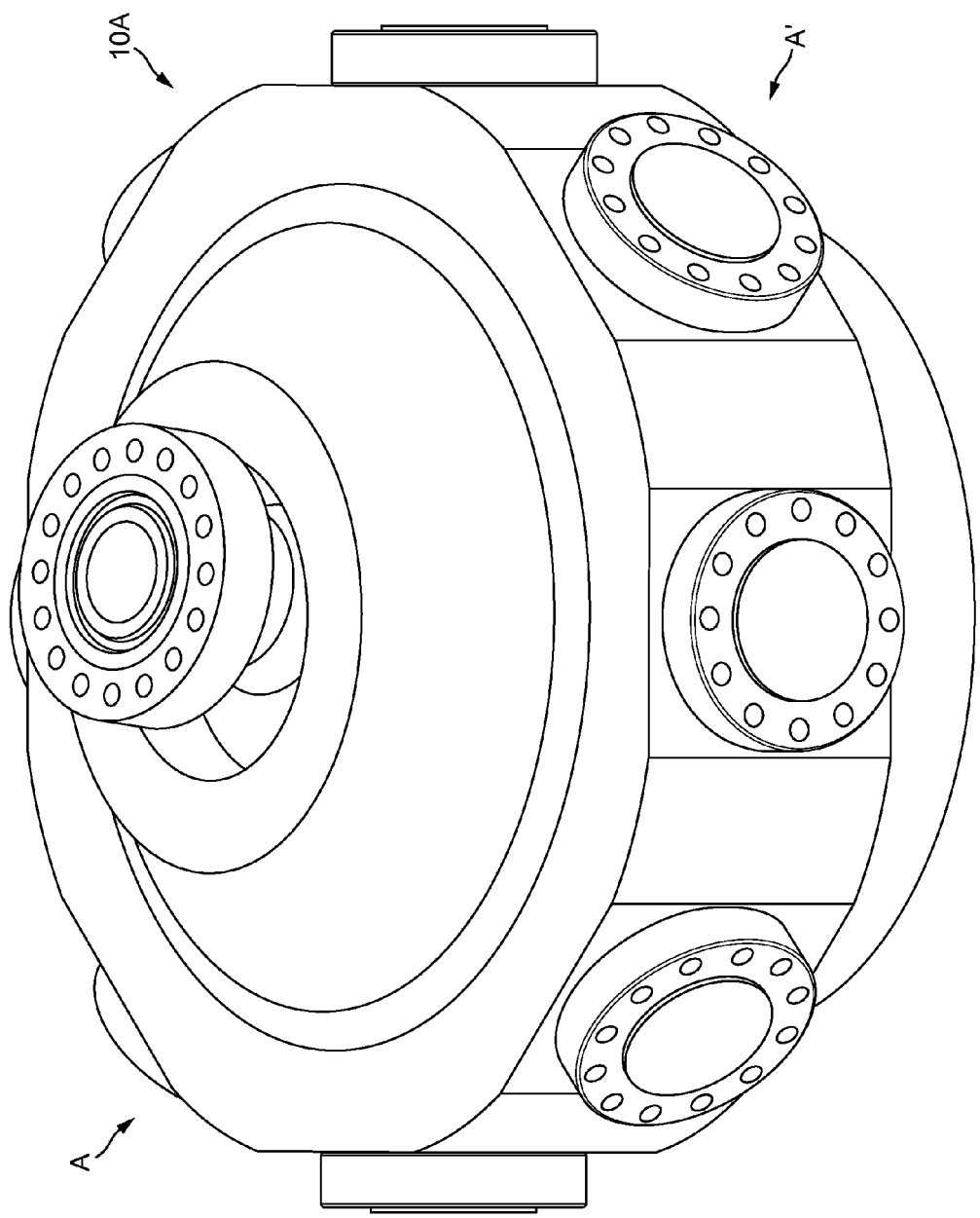
FIG. 1 is a perspective view of a connector according to an embodiment of the present invention.
Figure 2:
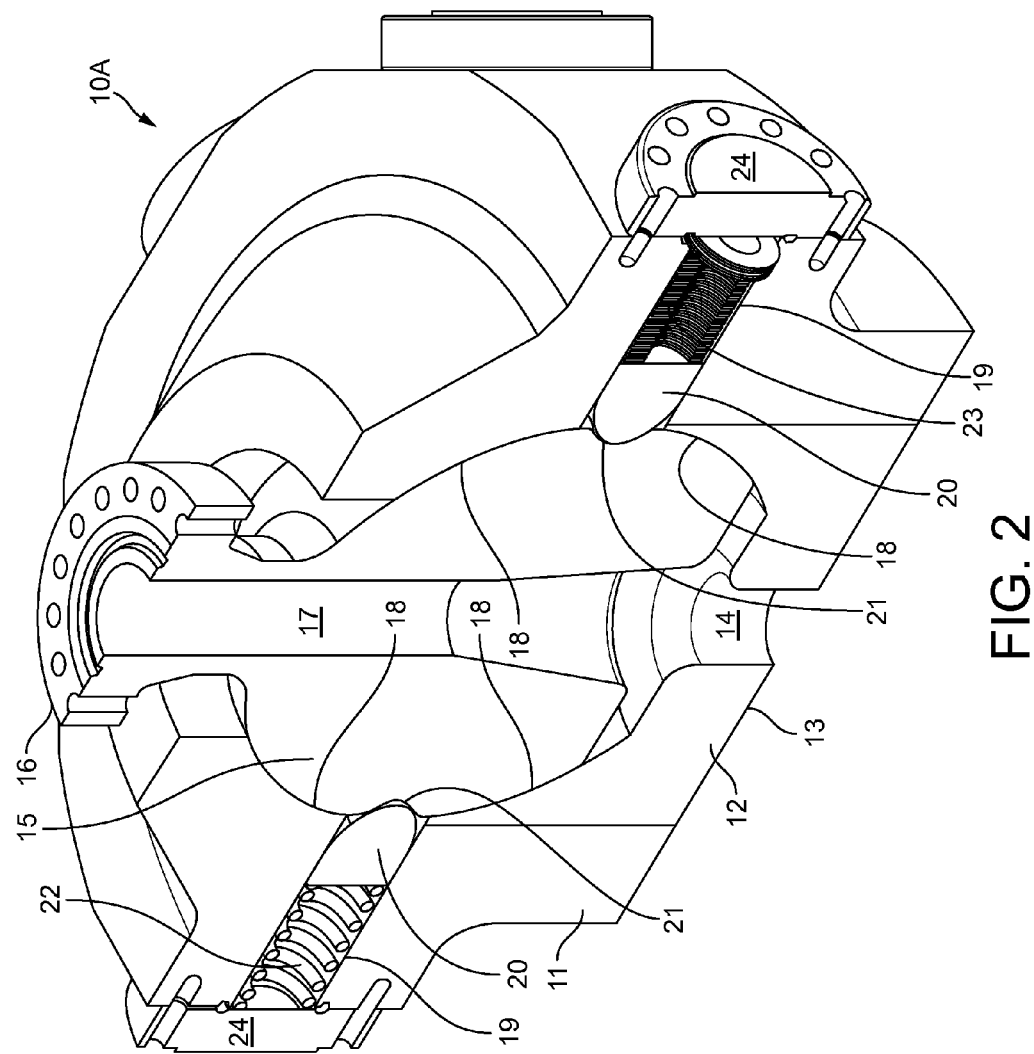
FIG. 2 is a perspective vertical section across the plane AA' of FIG. 1 with a ball in the locked vertical position.
Figure 3:
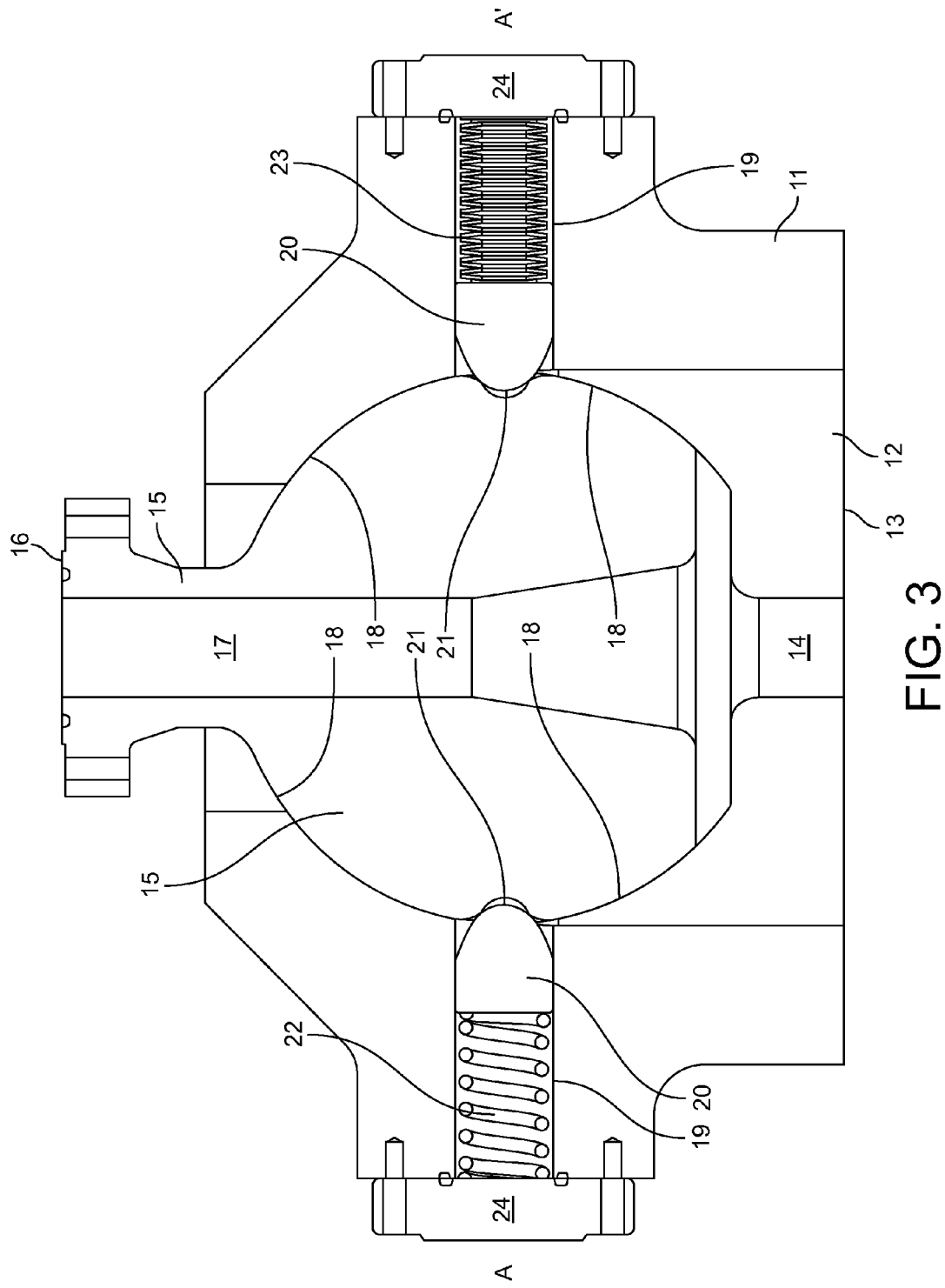
FIG. 3 and FIG. 3A are plane vertical sections across AA' of FIG. 1 also with the ball in the locked vertical position.
Figure 3A:
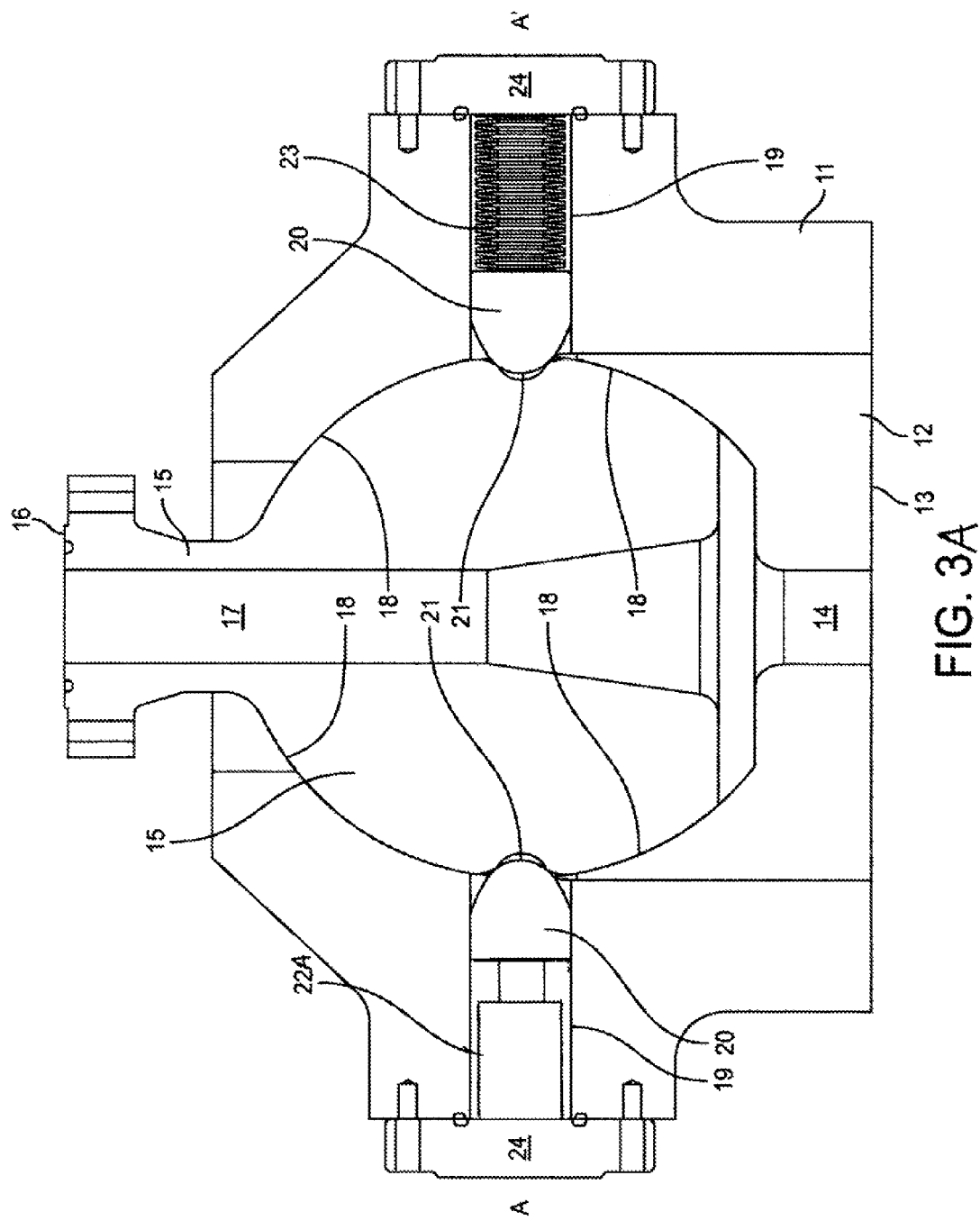

FIGS. 1 to 5 illustrate the construction and operation of a connector 10A according to an embodiment of the present invention for operating as a riser bending relief joint. Connector 10A comprises outer and inner body parts 11,12 which contain a joint comprising a ball joint 15. As shown in FIGS. 1 to 5, the ball joint 15 is inserted in the outer body part 11 from the lower side and retained in place by the inner body part 12 which is threaded (or otherwise fixed) into the outer body part 11. The inner body part 12 has a through-passageway in the form of a bore 14 and a lower face 13 which, as illustrated, is intended for connection to an emergency disconnect package (EDP). The ball joint 15 has a through-passageway in the form of a bore 17 which is axially aligned with bore 14 when the ball is in the locked vertical position shown in FIGS. 2 and 3. The upper face 16 of the ball joint 15 is intended for connection to a riser string.

The ball joint 15 is provided with locating features 21, which are engaged by detents 20 of detent mechanisms in the body part 11. The locating feature 21 may be an indention on the ball joint 15. Fluid seals (not shown) are provided circumferentially around the ball joint 15 in the region 18 between ball joint 15 and outer body part 11. The detents 20 are inserted in ports 19 and are spaced evenly around the outer body part 11, and are forced into engagement with features 21 by springs of the detent mechanisms, such as coil springs 22 or disk springs 23. In one embodiment, the springs may be composite springs.

The springs are shown held in place by retaining mounts 24 of the detent mechanisms, which mounts can incorporate spacers or other means to adjust the spring rates.

It will be apparent that the springs could be replaced by alternative means, such as hydraulically driven pistons 22A to adjust the force applied to the detents 20.

Figure 4:
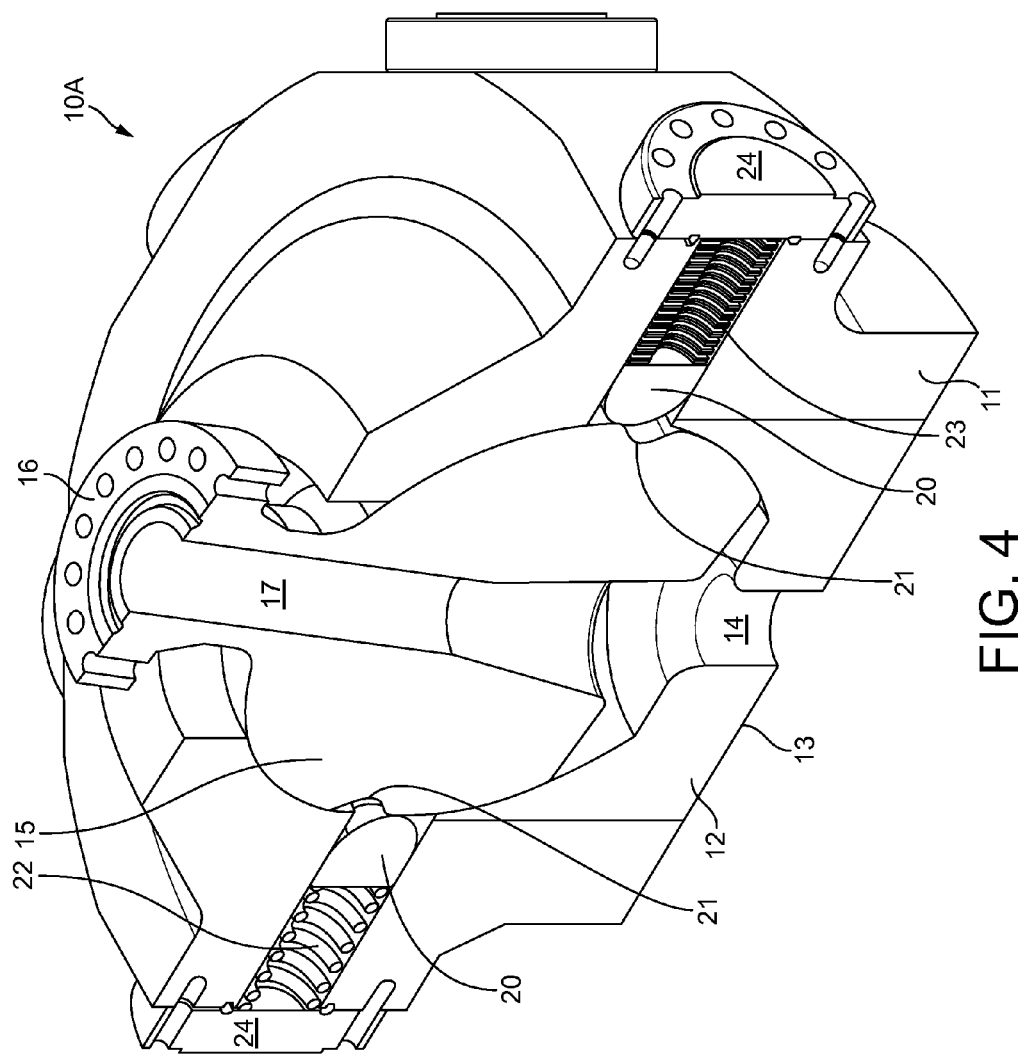
FIG. 4 is a perspective vertical section across the plane AA' of FIG. 1 with the ball displaced from the vertical and its detents disengaged.
Figure 5:
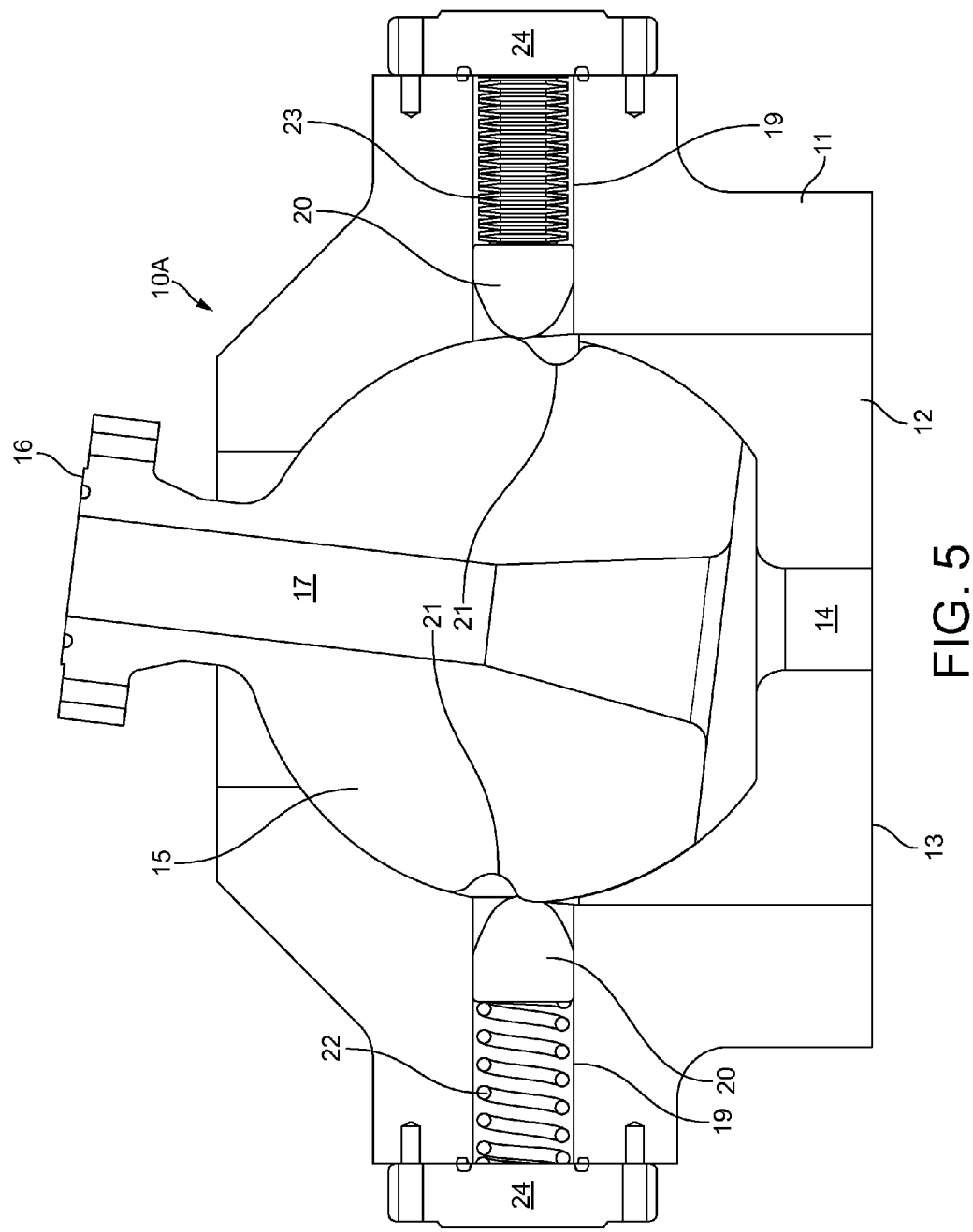
FIG. 5 is a plane vertical section across AA' of FIG. 1 with the ball displaced as in FIG. 4.
Figure 6:
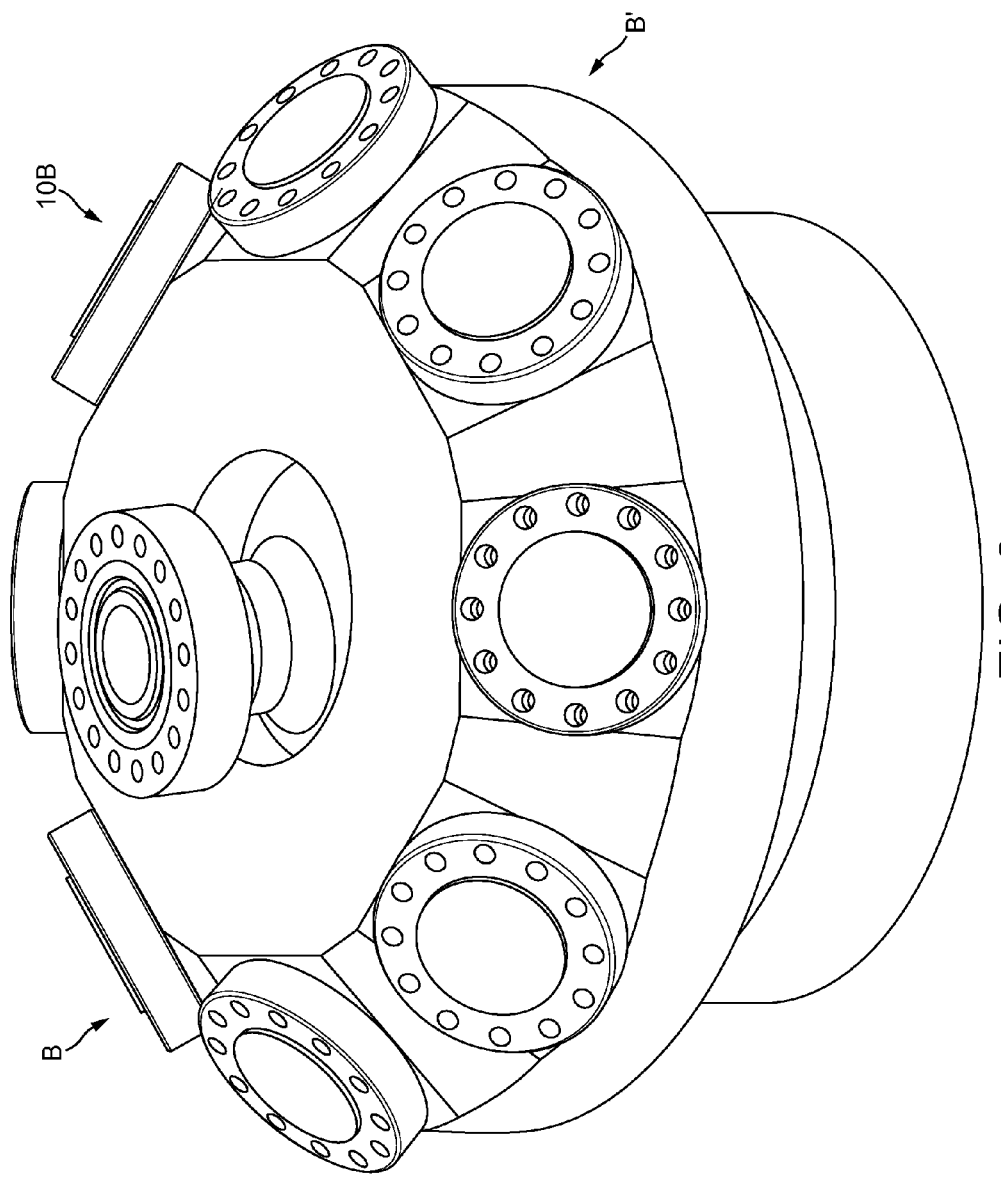
FIG. 6 is a perspective view of a connector according to an embodiment of the present invention.
Figure 7:
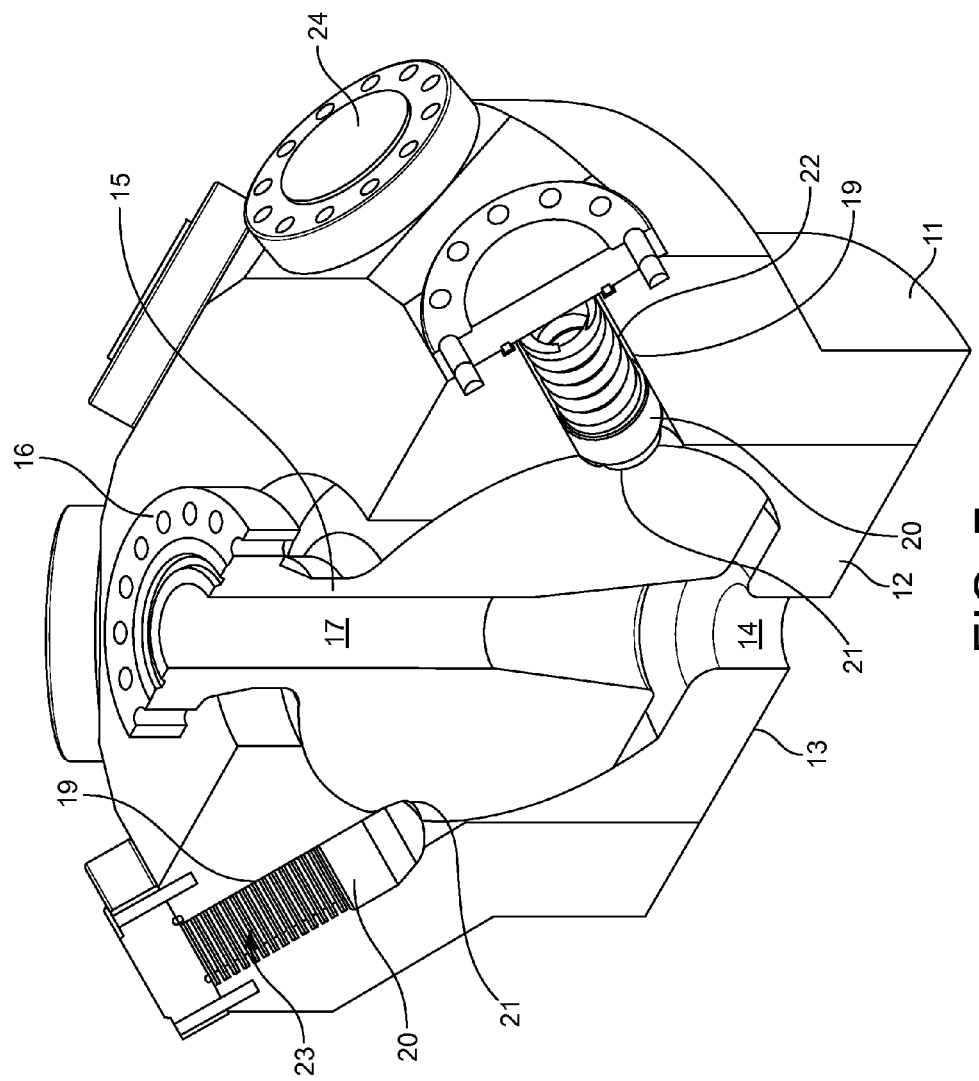
FIG. 7 is a perspective vertical section across the plane BB' of FIG. 6 with the ball in the locked vertical position.
Figure 8:
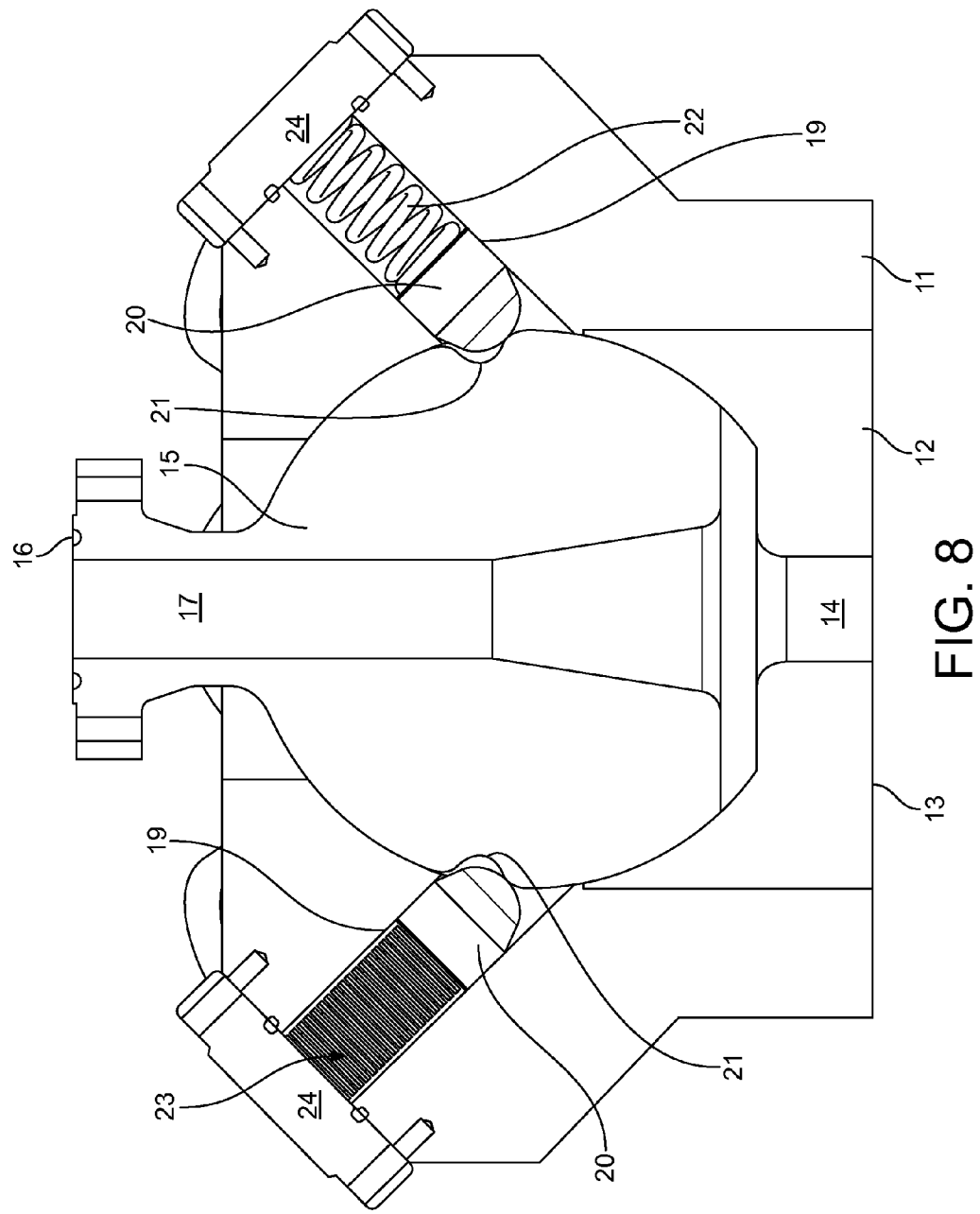
FIG. 8 is a plane vertical section across BB' of FIG. 6 also with the ball in the locked vertical position.
Figure 9:
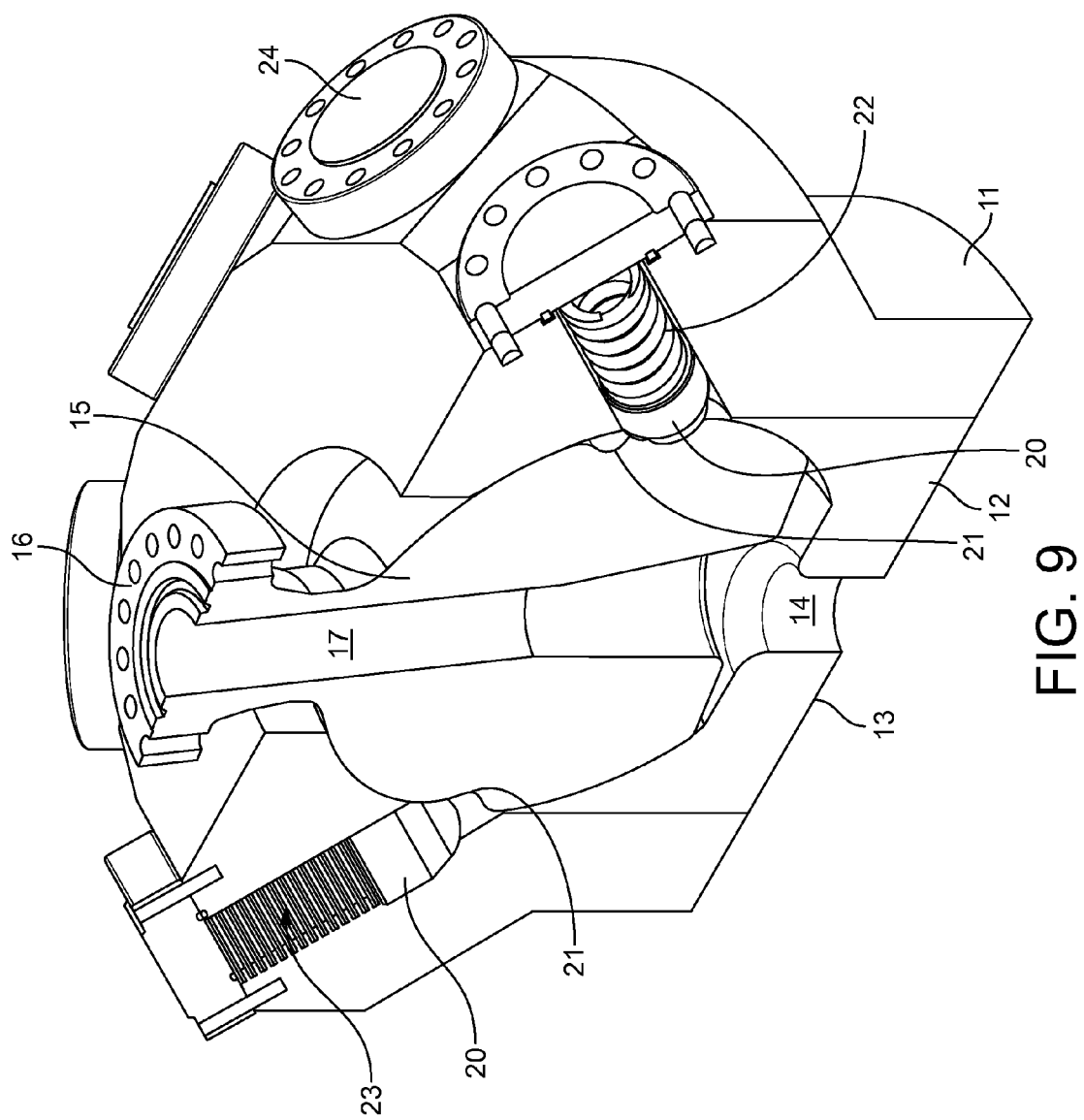
FIG. 9 is a perspective vertical section across the plane BB' of FIG. 6 with the ball displaced from the vertical and its detents disengaged.
Figure 10:
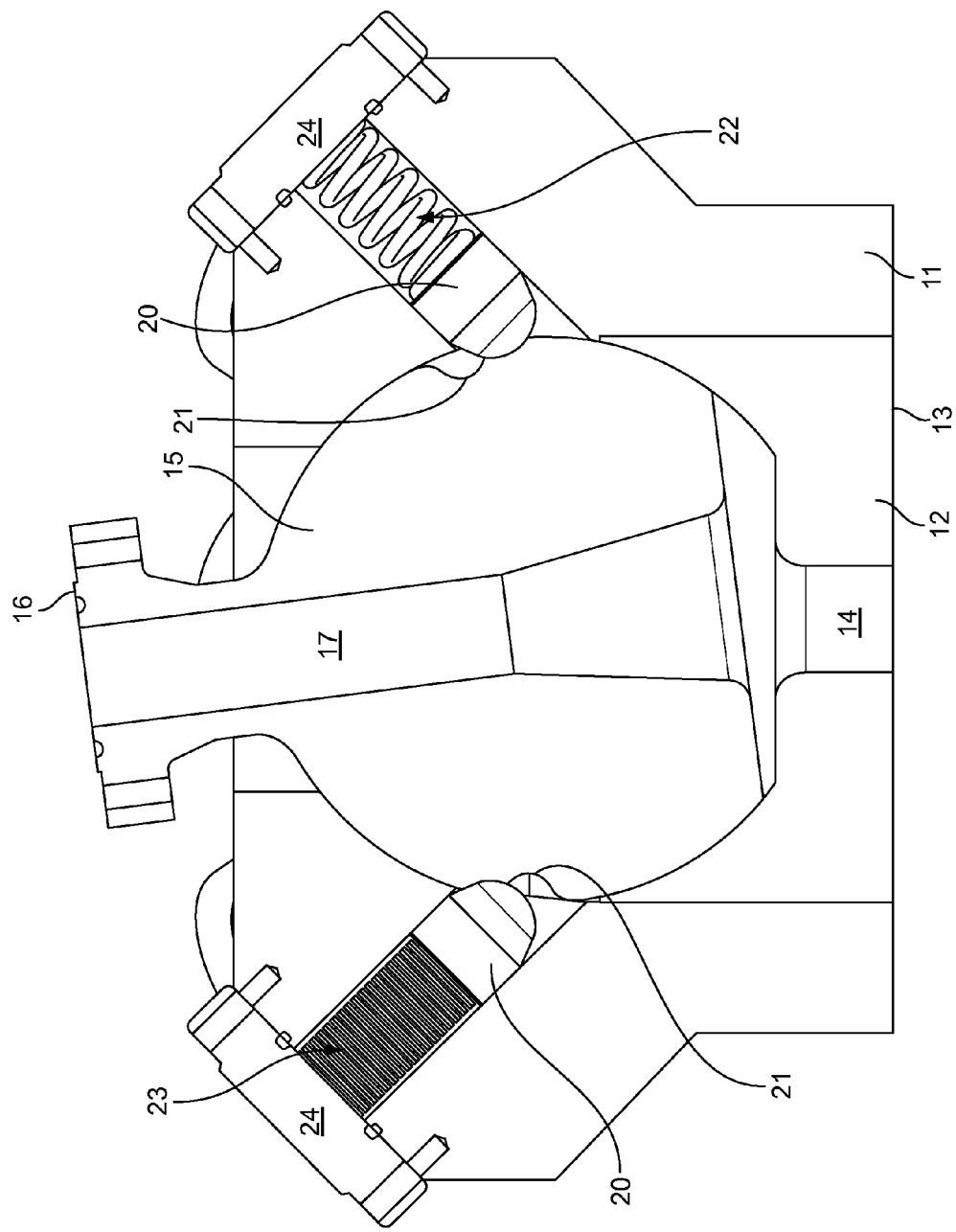
FIG. 10 is a plane vertical section across BB' of FIG. 6 with the ball displaced as in FIG. 9.

As shown in FIGS. 4 and 5, when a sufficient bending moment has been applied by a riser connected to the upper face 16 of ball 15, the detents 20 disengage from the locating features 21 and the ball joint 15 is free to rotate angularly away from the vertical and thereby relieve bending stress applied by the attached riser through the connector to the wellhead, the bores 14 and 17 no longer being aligned. A profile is cut in each of bores 14 and 17 to ensure no snagging and to facilitate the bores no longer being aligned.

FIGS. 6 to 10 illustrate the construction and operation of a connector 10B according to another embodiment of the present invention. As shown in FIGS. 6 to 10, the ports 19 and the detent mechanisms 20,22,23,24 around the upper part of body part 11 are not disposed horizontally relative to the axes of the bores 14 and 17 (that is in directions normal to the axis of bore 14) but are inclined relative to bore 14. It is anticipated that such an alternative disposition of the ports 19 and components of the detent mechanisms 20,22,23,24 may be preferable in situations where lateral access is more restricted for some reason or where an alternative load path within the tool is desired. Components in FIGS. 7 to 10 which correspond with components in FIGS. 2-5 have been identified by the same reference numerals as in FIGS. 2 to 5.

Figure 11:
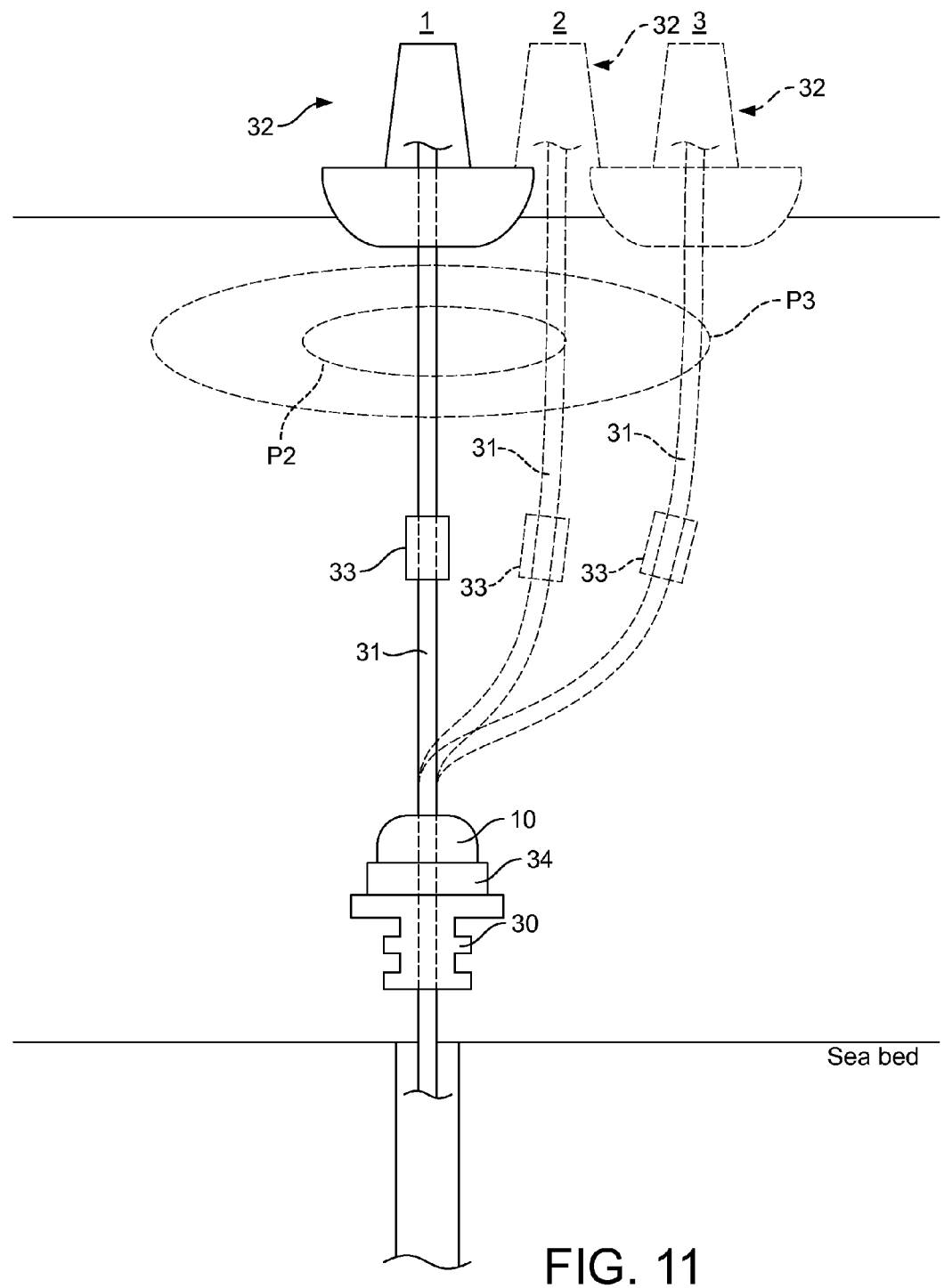
FIG. 11 is a diagram illustrating how the safe operating range for a surface vessel may be extended by use of a connector according to embodiments of the present invention.

The diagram of FIG. 11 schematically illustrates how the safe operating area for a surface vessel 32 may be increased by using a connector 10 according to embodiments of the present invention positioned above a wellhead 30 and connected to riser string 31. The connector 10 maintains the ball joint of the connector and connected riser in rigid alignment close to the wellhead 30 until the vessel 32 is displaced from central location 1 vertically above the wellhead to a location 2 on a circular perimeter P2, when a predetermined bending moment applied to the ball joint triggers release of the detents. The surface vessel may then move safely to a position 3 within a wider circular perimeter P3 without excessive tensile or bending stress being applied to the riser string 31 and wellhead 30. The riser string may incorporate a tensile weak link 33 and the wellhead may be provided with a quick-release emergency disconnect package (EDP) 34 to operate and avoid damage should the surface vessel be likely to go outside the safety perimeter P3.

In the examples described, the body 11,12 of the connector is connected to an EDP and the ball 15 is connected to a riser. It will be apparent that a connector according to embodiments of the present invention may also be adapted for connection in an inverted form if necessary—i.e. with the ball joint for connection to an EDP and the body adapted for connection to a riser.

A connector and method according to the present invention have the advantage that the through-passageways and riser are maintained in alignment within a safe working range of bending moment, but when the predetermined limit is reached the bending stress can be quickly and consistently relieved before damage occurs to connected riser or wellhead elements. Any tooling that is run through the passageways is also protected and extra opportunity to retrieve such tooling is provided.

In one embodiment of the present invention, a plurality of detent mechanisms are provided and spaced around the body to engage corresponding locating features 21 on the ball joint 15. In another embodiment, the detent mechanisms are evenly spaced around the axis of the through-passageway of the body.

In another embodiment, the detent mechanism comprises at least one adjustment mechanism for adjusting the force to be applied to the corresponding locating feature 21 for determining the predetermined bending moment required to trigger movement of the ball joint 15.

In another embodiment, the adjustment mechanism comprises at least one mechanism for adjusting the spring rate of the spring of the detent mechanism if the latter includes a spring; or the adjustment mechanism comprises hydraulic means.

In another embodiment, the detent mechanism is disposed in a direction normal to the axis of the through-passageway of the body. Alternatively, the detent mechanism is disposed in a direction inclined relative to the axis of the through-passageway of the body.

In another embodiment, the body comprises an outer body 11 part which receives the ball joint 15 and an inner body part 12 retaining the ball joint 15 in place.

The utilization of an adjustable detent mechanism in co-operation with a locating feature 21 on the ball joint 15 offers the advantage that the connector 10A, 10B may be mechanically reset simply by repositioning of the respective external conduit elements in alignment (for example by repositioning a surface vessel in alignment above the wellhead-connector-riser assembly so that the or each detent mechanism re-engages with the relevant locating feature 21 in the connector 10A, 10B). Additionally, if the detent mechanism trips and a disconnect is carried out at a connector lower in the stack, the detent mechanism will reset under gravity allowing for possible re-connection or a normal recovery to the vessel.

It will be appreciated that the first and second external conduit elements referred to herein may include riser pipe or other tubular elements or wellhead fixtures such as a blowout preventer, and do not themselves form part of the connector itself.

In a further alternative arrangement, the detent mechanism comprises a shear member which is designed to shear when the limiting bending moment is applied. Such an arrangement would have the disadvantage, however, that it could not be reset without reinstalling a replacement shear member.

What is claimed is:

1. A connector for use with a subsea riser installation, the connector comprising:
    a body, wherein the body comprises:
        a first connecting face comprising a through-passageway and adapted for connection to a first external conduit element and a ball joint within the body, wherein the ball joint comprises a through-passageway which is substantially aligned with the through-passageway in the first face; and
        a second connecting face on an opposite side of the connector to the first connecting face and adapted for connection to a second external conduit element; and
    at least one detent mechanism adapted to engage a corresponding locating feature on the ball joint, the locating feature comprising an indentation on the ball joint, wherein the through-passageway in the first face and the through-passageway in the ball joint are maintained in alignment, wherein the ball joint is prevented from moving relative to the body until a predetermined bending moment is applied to the ball joint across the axis of the through-passageway in the ball joint, and wherein the at least one detent mechanism comprises a detent acted on by an applied linear force.

2. The connector according to claim 1, comprising a plurality of detent mechanisms, wherein the detent mechanisms are spaced around the body to engage corresponding locating features on the ball joint.

3. The connector according to claim 2, wherein the detent mechanisms are evenly spaced around the axis of the through-passageway in the first face of the body.

4. The connector according to claim 1, wherein the at least one detent mechanism comprises at least one adjustment mechanism configured to adjust the force to be applied to the corresponding locating feature for determining the predetermined bending moment required to trigger movement of the ball joint.

5. The connector according to claim 4, wherein the at least one adjustment mechanism of the at least one detent mechanism comprises hydraulic means.

6. The connector according to claim 1, wherein the applied linear force that acts on the detent is by a spring or a piston.

7. The connector according to claim 1, wherein the at least one detent mechanism comprises at least one adjustment mechanism configured to adjust a force to be applied to the corresponding locating feature for determining the predetermined bending moment required to trigger movement of the ball joint, the at least one detent mechanism comprises a detent acted on by a spring and the at least one adjustment mechanism of the at least one detent mechanism comprises a mechanism for adjusting the spring rate of the spring.

8. The connector according to claim 1, wherein the at least one detent mechanism is disposed in a direction normal to the axis of the through-passageway in the first face of the body.

9. The connector according to claim 1, wherein the at least one detent mechanism is disposed in a direction inclined relative to the axis of the through-passageway in the first face of the body.

10. The connector according to claim 1, wherein the body further comprises an outer body part adapted to receive the ball joint and an inner body part adapted to retain the ball joint in place.

11. A riser installation comprising the connector according to claim 1.

12. A connector for use with a subsea riser installation, the connector comprising:
    a body, wherein the body comprises:
        a first connecting face having a through-passageway and adapted for connection to a first external conduit element and a ball joint within the body, wherein the ball joint comprises a through-passageway which is substantially aligned with the through-passageway in the first face; and
        a second connecting face on an opposite side of the connector to the first connecting face and adapted for connection to a second external conduit element; and
    a plurality of detent mechanisms adapted to engage corresponding locating features on the ball joint, the locating feature comprising an indentation on the ball joint, wherein the through-passageway in the first face and the through-passageway in the ball joint are maintained in alignment and the ball joint is prevented from moving relative to the body until a predetermined bending moment is applied to the ball joint across the axis of the through-passageway in the ball joint, wherein the detent mechanisms are evenly spaced around the axis of the through-passageway in the first face of the body and each of the detent mechanisms comprises at least one adjustment mechanism configured to adjust the force to be applied to the corresponding locating feature for determining the predetermined bending moment required to trigger movement of the ball joint, and wherein the at least one detent mechanism comprises a detent acted on by an applied linear force.

13. A method of providing a relief joint for a riser installation, the method comprising:
    providing a connector comprising:
    a body, wherein the body comprises a first connecting face comprising a through-passageway, a ball joint within the body, wherein the ball joint comprises a through-passageway which is substantially aligned with the through-passageway in the first face, a second connecting face on an opposite side of the connector to the first connecting face, and at least one detent mechanism which engages a corresponding locating feature on the ball joint, wherein the at least one detent mechanism comprises a detent acted on by an applied linear force, the locating feature comprising an indentation on the ball joint, wherein the through-passageway in the first face and the through-passageway in the ball joint are maintained in alignment and the ball joint is prevented from moving relative to the body until a predetermined bending moment is applied to the ball joint across the axis of the through-passageway in the ball joint;

connecting the first connecting face to a first external conduit element; and connecting the second connecting face to a second external conduit element.

14. The method according to claim 13, wherein the connector comprises a plurality of detent mechanisms, wherein the detent mechanisms are spaced around the body to engage corresponding locating features on the ball joint.

15. The method according to claim 13, further comprising:
adjusting a force applied by the at least one detent mechanism to the corresponding locating feature for determining the predetermined bending moment required to trigger movement of the ball joint.

16. The method according to claim 13, wherein the applied linear force that acts on the detent is by a spring or a piston.

17. The method according to claim 13, further comprising:
adjusting a force applied by the at least one detent mechanism to the corresponding locating feature for determining the predetermined bending moment required to trigger movement of the ball joint, wherein adjusting the force comprises adjusting the spring rate of the spring of the at least one detent mechanism.

18. The method according to claim 17, wherein the force applied by the at least one detent mechanism is adjusted using hydraulic means.

19. The method according to claim 13, wherein the at least one detent mechanism is disposed in a direction normal to the axis of the through-passageway in the first face of the body.

20. The method according to claim 13, wherein the at least one detent mechanism is disposed in a direction inclined relative to the axis of the through-passageway in the first face of the body.

* * * * *